Fig. 1

INVENTOR.
Richard A. Davis
ATTORNEY

June 2, 1953  R. A. DAVIS  2,640,958
MOISTURE CONTROLLED MOTOR SYSTEM
FOR CLOSING AUTOMOBILE WINDOWS
Original Filed April 12, 1950  5 Sheets-Sheet 3

INVENTOR.
Richard A. Davis
BY
ATTORNEY

Fig. 10.

Patented June 2, 1953

2,640,958

UNITED STATES PATENT OFFICE 2,640,958

MOISTURE CONTROLLED MOTOR SYSTEM FOR CLOSING AUTOMOBILE WINDOWS

Richard A. Davis, Miami Beach, Fla.

Continuation of abandoned application Serial No. 155,472, April 12, 1950. This application September 20, 1950, Serial No. 185,817

9 Claims. (Cl. 318—470)

This invention relates to automobiles and particularly to the type thereof which is provided with power means for closing both the top and/or the windows. More specifically, the present invention relates to means for automatically setting said power means into operation.

This application is a continuation of my prior application Serial No. 155,472 filed April 12, 1950, now abandoned.

Many types of automobiles have been designed, some with folding convertible tops, some with non-folding or rigid tops adapted to be moved bodily into open and closed positions, and others with fixed tops; all of which types are provided with sliding windows. In the present application, the invention is illustrated and described as applied to a convertible top automobile; but it is to be understood that the invention is applicable to any type of car equipped with electrically controlled means for closing either the top, or the windows, or both.

Automobiles of any of the types having a movable top are, or may be provided with electrically controlled operating means, either electric, hydraulic or mechanical, for closing the top when desired; and with similar electrically controlled power means for closing the windows.

Individual press-button actuated switches are usually provided for selectively setting said means into operation. Such operating means are well known in the art, and it is to be understood that the present invention does not relate to the top and window actuating means, per se, which may be of any preferred type, but relates to means for automatically setting said actuating means into operation.

The top, when movable, and the windows, constitute a plurality of closures for an automobile; and the primary object of the present invention is to provide, in an automobile equipped with power means for selectively closing said closures, means for automatically setting said power means into operation, in case of rain, drizzles or excessive mists, should the automobile have been left unattended with the closures open.

A further object of the invention is to provide means for accomplishing the above stated result without in any manner interfering with the usual manually controlled means provided for the purpose.

A further object of the invention is to provide means as mentioned which shall ensure a reasonably rapid closing of the car without excessive drain on the battery.

A further object of the invention is to provide an automatic control system as above stated which will be entirely disconnected and rendered inoperative while the ignition switch is closed.

A further object of the invention is to provide a system as stated which may be either factory installed in the car, or installed later as an accessory to any car provided with electrically controlled means for actuating the top and/or windows.

Other objects will appear hereinafter.

With the above stated objects in view, the invention consists generally in a normally open auxiliary parallel circuit for each of said closing mechanisms, electrically actuated circuit closing means in each of said auxiliary circuits, and moisture actuated means for initially starting said circuit closing means into operation. The said electrically actuated circuit closing means are preferably arranged and connected so as to set the several power actuated closure mechanisms into operation in sequence, or in group sequence, so as to avoid undue drain on the battery.

The invention further consists in various details and arrangements of parts as will be described hereinafter and particularly pointed out in the claims.

The invention will be more readily understood by reference to the accompanying drawings, forming a part of this specification and in which.

Figure 1:
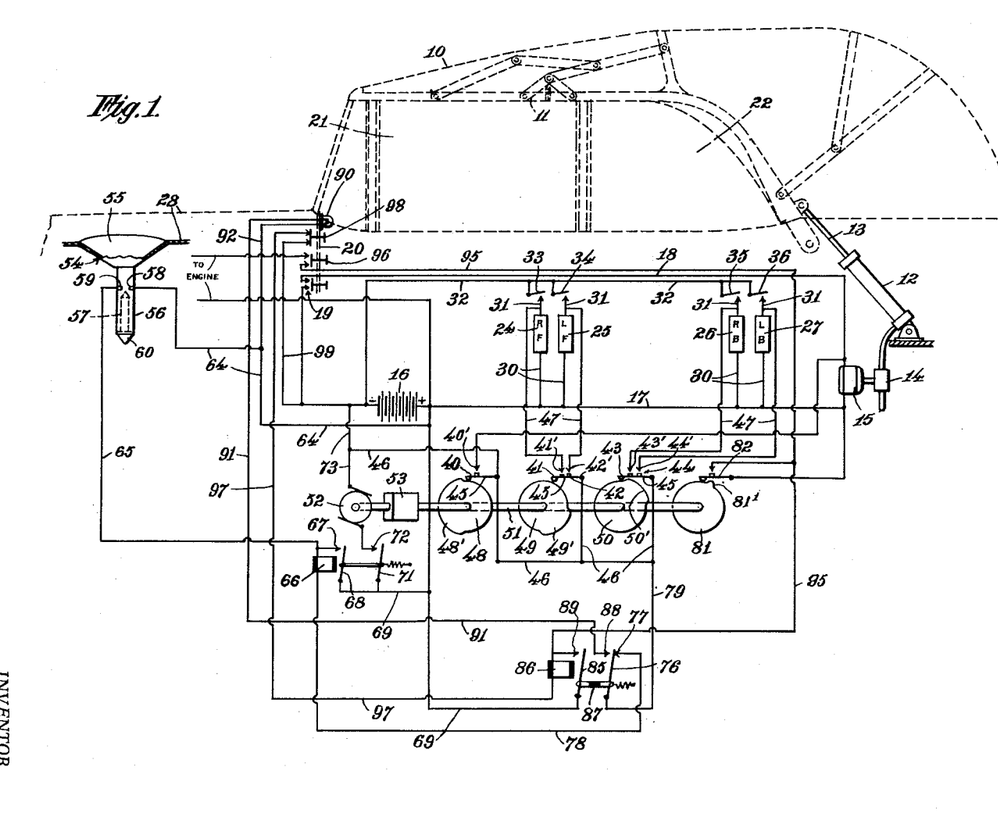
Fig. 1 is a diagram illustrating the invention as applied to the circuits of a car equipped with electrically actuated, manually controlled closing means.

Referring to Fig. 1 of the drawings, 10 indicates the folding top of an automobile, and 11 the frame thereof which is extended into the closed position illustrated by any suitable means such as a cylinder 12 and plunger rod 13 actuated by a hydraulic pump 14 driven by a motor 15. The motor 15 is connected to the positive side of the usual battery 16 by a lead 17, and to the negative side of the battery by a lead 18 in which is interposed a switch 19, usually of the push button type and preferably located on the instrument board or dash 20.

The specific statements herein as to the connections to the positive and negative poles of the battery have been used merely to simplify the description, and it should be understood to mean that the connections are to the opposite poles of the battery, as the polarity may be reversed from that indicated in the drawings without altering the construction or operation of the device.

Front and back windows are indicated at 21 and 22 respectively. The windows are equipped with electrically operated closing mechanisms 24, 25, 26 and 27, the same being provided for the right front, left front, right back and left back windows respectively. As details of said closing means may be of any preferred form, and as the construction thereof is not material to the present invention, said closing means are designated in the drawings by quadrilaterals bearing respectively the initials R. F.—L. F.—R. B. and L. B. indicating the respective window which each is designed to operate.

The top 10, top frame 11, windows 21 and 22, and the hood 28 of the car are illustrated in dotted lines, as the form and specific details thereof are not essential to the present invention, and also to avoid confusion with the diagram of the circuits.

The window operating mechanisms 24, 25, 26 and 27 are connected to the positive lead 17 of the battery by conductors 30, and to the negative side of the battery by conductors 31 connected to a negative lead 32. In each of the conductors 31 is interposed a switch, preferably of the push-button type, so that each window may be operated by its respective actuating mechanism by manually closing the proper switch. Said switches are designated in the drawings by the numerals 33, 34, 35 and 36 for the circuits to the window closing mechanisms 24, 25, 26 and 27 respectively.

The elements so far mentioned and described are those common to automobiles of the type above mentioned which are equipped with electrically actuated top and/or window closing and opening means; and as the details of such parts vary in different makes and models of cars, such details are not illustrated in the drawings but merely indicated therein to an extent necessary to a proper understanding of the present invention.

The primary object of the present invention is to provide means for automatically closing the circuits normally controlled by the switch 19 and/or the several switches 31, in order to set into operation the car closing means above described in the event of rain, drizzles or excessive mists, should the car have been left unattended and with the top and/or windows open. It is to be understood that the opening mechanism is not included, as such mechanism is separately and manually operated, and has no bearing on the present invention which is designed solely for automatically actuating the closing mechanisms.

To this end an auxiliary switch is arranged in parallel with each of the switches 19 and 31, and means are provided for automatically closing said switches to complete the circuits to the several closing mechanisms in the desired order.

Referring to Fig. 1, a switch 40 is arranged in parallel with the switch 19 of the top actuating mechanism; and switches 41, 42, 43 and 44 are arranged in parallel with the switches 33, 34, 35 and 36 respectively of the window closing mechanisms 24, 25, 26 and 27. The switches 40 to 44 inclusive include fixed contacts 40', 41', 42', 43' and 44' respectively, and a preferably flexible movable contact 45. The movable contacts 45 are connected by conductors 46 to the negative side of the battery 16; and the several fixed contacts are connected by conductors 47 to the negative sides of the respective closing mechanisms 15 and 24 to 27 inclusive.

Figure 4:
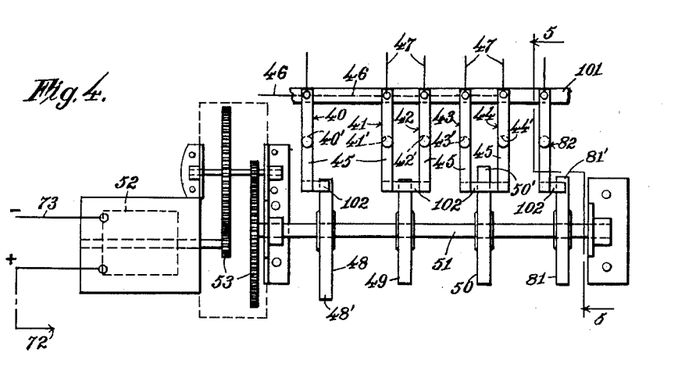
Fig. 4 is a detail plan view of the multiple switch operating means.

The movable arms 45 are actuated to engage the fixed contacts by cam discs 48, 49 and 50 mounted on a shaft 51 driven by a motor 52 through interposed reduction gearing 53 as illustrated in Fig. 4; and the circuit to the motor 52, fully described hereinafter, is completed through a circuit closing device which is actuated by accumulation of rain water or by drizzles or heavy mists.

Figure 9:
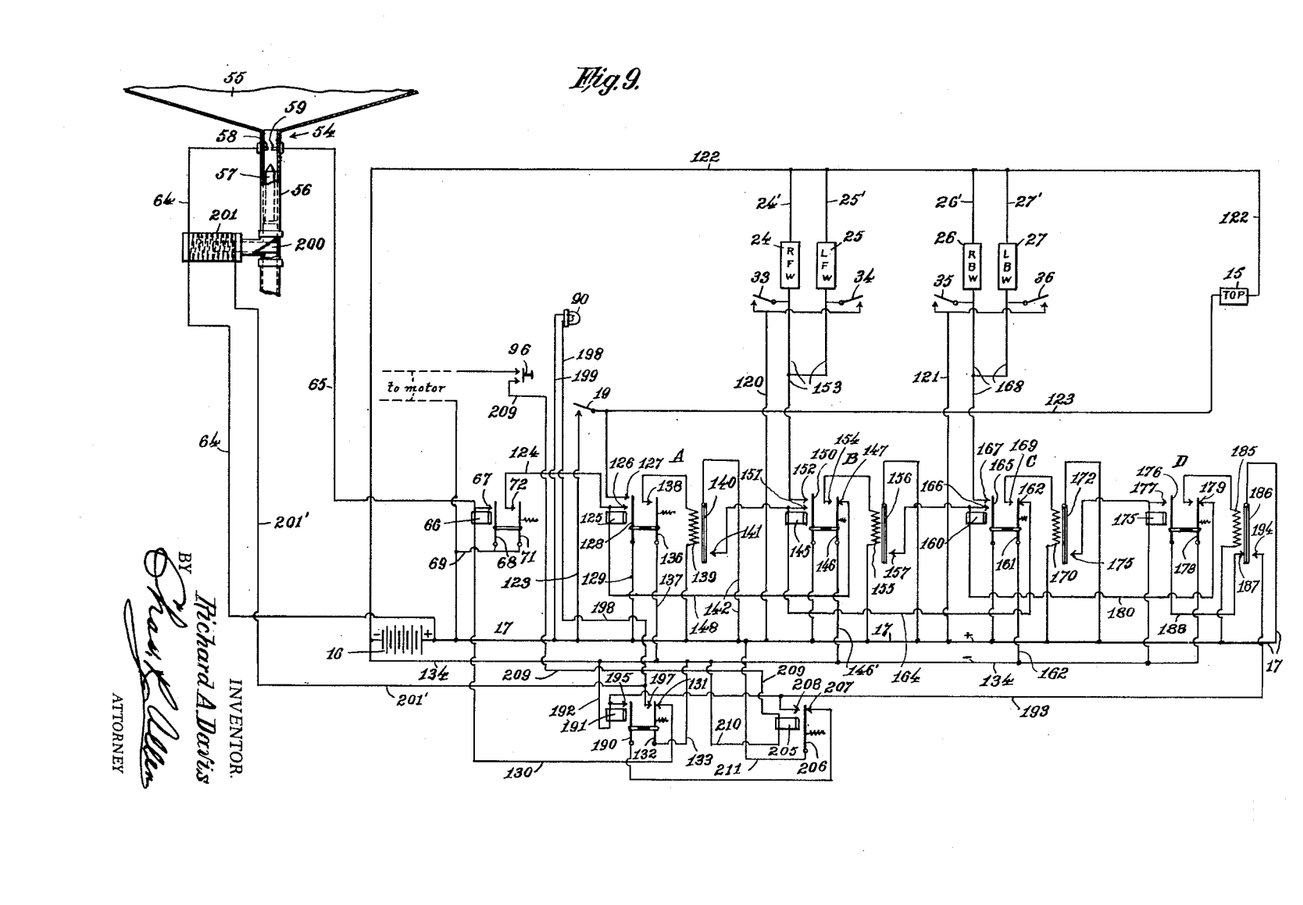
Fig. 9 is a diagram of a further modification of the invention wherein the motor driven cams for actuating the several switches are replaced by time delay actuating means.
Figure 10:
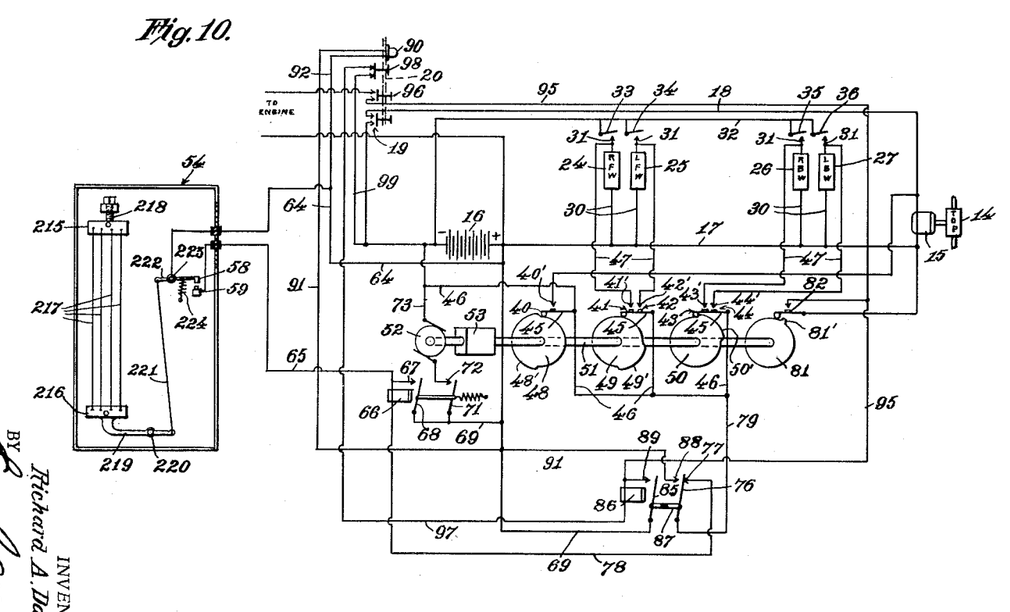
Fig. 10 is a diagram similar to Fig. 1 but illustrating diagrammatically hygroscopically actuated means for initially starting the device into operation.

The circuit closing device may be one actuated by accumulated rain water as illustrated in Figs. 1 to 3, and 6 to 9 inclusive, or it may be a device sensitive to drizzles or heavy mists, as illustrated in Fig. 10.

Figures 2, 3:
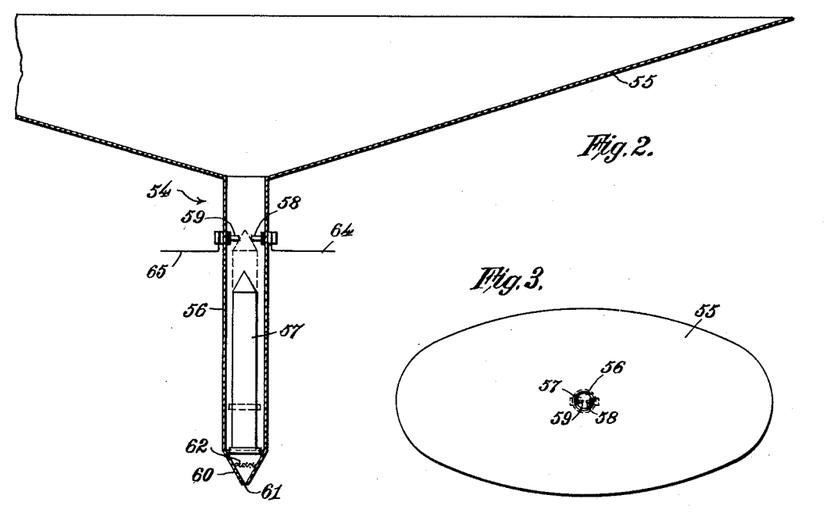
Fig. 2 is a detail sectional view of a rain water accumulator, and primary switch arrangement, such as may be used as part of the device illustrated upon a much enlarged scale.
Fig. 3 is a plan view of the same upon a reduced scale.

A rain water actuated switch 54 is illustrated in Figs. 2 and 3 of the drawings, and comprises a funnel shaped member consisting of an upper flared rain catchng portion 55, a vertical tubular well 56 in which is arranged a preferably copper clad float 57, and contact members 58 and 59. The well 56 terminates in a conical bottom 60 at the apex of which is a minute drain opening 61. A screen 62 may be arranged above the opening 61 to prevent foreign matter from clogging the same.

Figures 6, 7, 8:
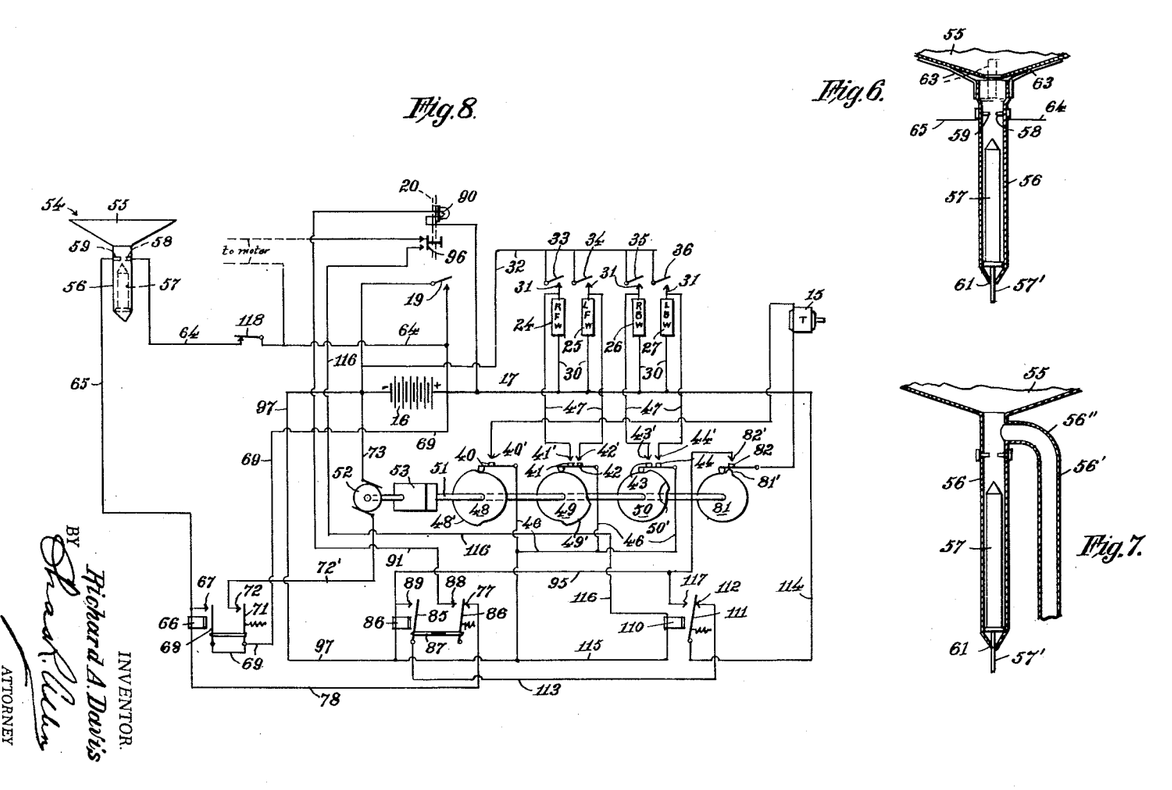
Fig. 6 is a detail view illustrating a modified form of drain for the water switch when such is used.
Fig. 7 is a similar view of a further modification of the water switch assembly.
Fig. 8 is a diagrammatic view of a modified form of the invention, wherein the ignition switch may be utilized to reset the mechanism.

An overflow may be provided to dispose of excess accumulation of rain water in the well 56, said overflow being preferably located between the bottom of the flared portion 55, and the contacts 58—59. As illustrated in Fig. 6, the well 56 may be attached to the portion 55 by straps 63, with the upper end of the well spaced below said portion. In Fig. 7 is illustrated a modified form wherein an overflow tube 56' is connected to the well 56 above the contacts 58 and 59, as by an elbow 56''.

Preferably a needle valve 57' is fixed to and extends downwardly from the float 57, as illustrated in Figs. 6 and 7. This valve normally extends through the drain opening 61 and minimizes the loss of water through said opening until the float 57 rises into engagement with the contacts 58 and 59; the length of the needle valve being such as to clear said drain opening when the float reaches the upper limit of the movement and engages said contacts.

The switch assembly 54 may be a unitary element, as shown in Figs. 2 and 3, adapted to be arranged at any desired position upon a car when the system is to be applied thereto as an accessory; or the upper flared portion 55 may be formed as a depression in the hood 28, or other part of the car, when the automatic system is factory installed at the time the car is made, as indicated in Fig. 1 of the drawings.

When rain water accumulates in the well 56, the float 57 rises until it engages the contacts 58 and 59 thereby closing the circuit to the motor as will be presently described. As the flared portion is considerably greater in area than the cross-section of the well 56, a comparatively small amount of rain will be sufficient to operate the switch. It is obvious that the parts of the device may be proportioned as found desirable.

The contact 58 of the switch device 54 is connected to the positive end of the battery 16 by a conductor 64; and the contact 59 is connected by a conductor 65 to a relay switch 66 having a fixed contact 67 connected to the conductor 65, and an armature 68 connected through a conductor 69 to the positive side of the battery 16, forming a shunt circuit for holding the switch elements 67—68 closed for the complete operation of the device, should the rain water switch be opened by draining of water from the well 56.

A switch arm 71, mechanically connected to the armature 68 and movable therewith, is also connected to the conductor 69 and engages a contact 72 when the armature 68 engages the contact 67. The contact 72 is electrically connected to the positive side of the motor 52, the opposite side of the motor being connected to the negative side of the battery by a conductor 73.

Interposed between the relay 66 and the negative side of the battery 16 is a normally closed switch comprising a switch arm 76 and a fixed contact 77. A conductor 78 connects the relay 66 with the contact 77, and a conductor 79 connects the switch arm 76 to the negative side of the battery, which may be accomplished by connecting conductor 79 to conductor 46, thus completing the circuit through the relay 66 except for the gap between the contacts 58 and 59 of the water switch 54. It is obvious that as soon as the float 57 is raised by the accumulation of rain water in the well 56 into engagement with air contacts 58 and 59, the relay 66 will be energized and close the switch 71—72 thereby completing the circuit to the motor 52 and setting the device into operation.

The energization of the relay 66 also closes the circuit through 67—68 thereby connecting the relay directly to the battery independently of the water-switch, and electrically locking the relay switch so as to maintain the device in operation until the closing of the top 10 and the several windows 21 and 22 is completed, even though the water should drain from the well 56 and open the switch therein.

The operation of the device as so far described is as follows, it being understood that the normal initial positions of the several elements are as illustrated in Fig. 1. Upon closing of the rain water switch 54, a current flows from the positive side of the battery 16 through the conductor 64 to said switch, thence by conductor 65 to relay 66, thence through conductor 78 and the closed switch 76—77 to the negative side of the battery through conductors 79 and 46. Energization of relay 66 closes switch 71—72, thereby closing the circuit to the motor 52 and starting the device into operation.

The cam discs 48, 49 and 50 are provided respectively with peripheral cams 48', 49' and 50' which successively close the switches 40 to 44 inclusive, and said peripheral cams may be arranged to actuate the switches in any desired order so as to prevent excessive drain on the battery. Preferably, the switch 40 controlling the circuit to the top closing mechanism is first actuated, and then the switches to the window closing means. The latter may be actuated in pairs, that is, both front windows may be simultaneously closed, and then both back windows. However, the order in which the window closing devices are operated is immaterial, and any desired arrangement may be employed.

Preferably, the cam 48' which closes the circuit to the top closing means, extends about half the circumference of the disc 48, thereby holding said circuit closed during approximately one half revolution of the shaft. The cams 49' and 50' are each about a quarter of the circumference of their respective discs and are arranged to close their respective switches in successive pairs.

The complete cycle of operations of the closing mechanisms is accomplished upon one revolution of the shaft 51; and in order that this may be completed as quickly as possible without undue drain upon the battery, the ratio of the reduction gearing 53 is such as to rotate the shaft 51 in approximately two minutes. This will cause the top to be closed in about one minute, the front windows in the next half minute, and the back windows in the following half minute. This timing is only approximate and may be varied as deemed necessary or desirable.

Upon completion of the cycle of operations to close the car, it is desirable to provide means for breaking the circuit to the motor 52 and also to automatically disconnect the water switch until the device is again manually reset, in order to prevent continual repetition of operation which would otherwise occur as long as the water switch remained closed during a continuous rain, or upon repeated closing the same with successive showers. To this end, the shaft 51 carries a cam disc 81 having a short peripheral cam 81' for closing a switch 82 which results in breaking the circuit to the motor 52 when the cycle of operations is completed, as will be presently described.

The switch arm 76 is mechanically connected to the armature 85 of a relay 86, as by a nonconducting bar 87, and is actuated therewith when the relay 86 is energized, to bring said switch arm 76 and said armature 85 into engagement with fixed switch points 88 and 89 respectively. This opens the switch 76—77 thereby breaking the circuit through the relay 66 and water switch 54, permitting the switches 67—68 and 71—72 to open, breaking the circuit to the motor 52 and stopping the operation.

A pilot light 90 is connected to the switch point 88 through a conductor 91, and to the positive side of the battery as by conductors 92 and 64, so that as soon as the operation is completed the pilot light will glow. The contact of the armature 85 and point 89 closes the circuit from the battery through the relay 96 and conductor 97 to a reset switch 98, maintaining said contact and continuing the glow of the pilot light until the device is reset by momentarily breaking the circuit at the reset switch.

Means are also provided for rendering the closing mechanism inoperative while the ignition switch is closed. To this end a conductor 95 connects the relay 86 to the ignition switch 96 on the dash board 20, so that upon closing the ignition switch the relay 86 is energized, and opens the switch 76—77 thereby breaking the circuit to the relay 66 and switch 54.

Figure 5:
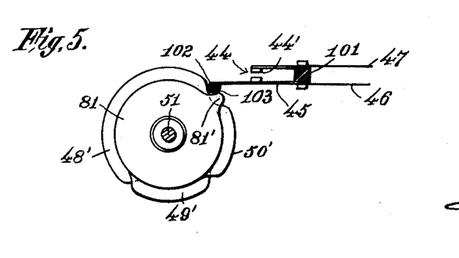
Fig. 5 is a detail section on substantially the line 5—5 of Fig. 4.

The preferred construction of the switches 40 to 44 inclusive for automatically closing the circuits to the several closing mechanisms, and also the switch 82 for stopping the device when the closing operations are completed, is illustrated in Figs. 4 and 5 of the drawings. As shown therein, a support 101, preferably of insulating material, is arranged substantially parallel with the cam shaft 51; and fixed to the underside of said bar 101 and extending therefrom toward the cam discs 48, 49, 50 and 81 are flexible arms 45. The arms 45 are disposed in substantial parallel relation to the sides of the respective cam discs and with the ends thereof spaced laterally from said discs. The ends of the arms 45 are provided with laterally extending cam engaging members 102 which are preferably of insulating material, and project into the paths of the respective cams. As the switches 41 and 42 are actuated simultaneously, as are also the switches 43 and 44, a single member 102 is provided for each of said pairs of switches. To minimize friction between the members 102 and the several cams, the under faces of said members are preferably rounded as indicated at 103.

Upon return of the operator to the closed car, the pilot light indicates that the mechanism has operated; and, when the car is provided with a convertible top, that the top should either be secured in place or lowered before the car is put in motion. Should he desire to reset the mechanism into operative condition, the reset switch 98 is momentarily opened, breaking the circuit to the relay 86 and permitting the armature 85 and switch arm 76 to return to initial position as illustrated in Fig. 1.

Fig. 8 illustrates a modified form of the invention in which the reset switch 98 is omitted and the ignition switch is employed for resetting the mechanism. In this form the several closure operating means together with the cam actuated circuit closing means for the same, are substantially identical to those illustrated in Fig. 1.

A third relay 110 is added to the circuit, the armature 111 of which is normally held in engagement with a contact point 112 electrically connected to the armature 85 by a conductor 113. The armature 111 is connected to the positive side of the battery by a conductor 114. One side of the relay coil 110 is connected as by conductors 115 and 97, to the negative side of the battery; and the other side of said coil is connected to one contact of the ignition switch 96 by a conductor 116. When the relay 110 is energized the armature 111 is moved into engagement with a switch point 117 which is electrically connected to the conductor 99 extending between the switch point 89 associated with the relay 86, and the contact points 82' of switch 82.

The operation of this modification of the invention is as follows, it being understood that the several parts are initially in the positions shown in Fig. 8. When rain water enters the water-switch 54 and raises the float 57 into engagement with the contacts 58 and 59, a circuit is completed to the relay 66 through the normally closed switch 76—77, the circuit being from the battery through conductor 64 to the water-switch contacts 58—59, thence through conductor 65 to relay 66, through conductor 78 to switch point 77, switch 76, and back to the battery through conductor 97. The energization of relay 66 closes the switch 71—72 thereby closing the circuit to the motor 52 through conductor 72' starting the closing mechanism into operation as hereinbefore described in connection with the circuit illustrated in Fig. 1.

Upon completion of the full cycle, cam 81' momentarily closes the contacts of switch 82 which closes the circuit to the coil of relay 86, electrically locking relay 86 in closed position through armature 85 and contact 89 of relay 86 and contact 112 of relay 110. Upon energizing relay 86 the switch arm 76 engages the contact 88 closing the circuit to the pilot light 90, and opens the coil circuit of relay 66 by breaking the contact between switch arm 76 and contact 77. This renders the water switch inoperable.

Upon return of the operator to the closed car, the pilot light 90 indicates that the mechanism has operated, and that the top should either be locked in place or lowered before the car is put in motion.

To reset the mechanism into operable position, it is but necessary to turn the ignition "on" and then "off." This operation will momentarily energize relay 110, thereby opening the battery circuit of relay 86 and permitting the switch 76 to engage contact 77.

The coil 110, being in the circuit of the ignition switch, is energized while the engine is running, thereby bringing the switch 12 into contact with the switch point 117 and closing the circuit to the relay coil 86, breaking the contact between the switch arm 76 and contact 77. This breaks the circuit to relay 66 rendering the same inoperative, and completely eliminating any automatic operation of the device while the car is in motion. Turning the ignition switch to "off" position deenergizes the coil 110 which in turn deenergizes the coil 86 placing the mechanism in operating position.

If preferred, a manually operable switch 118 may be provided in the circuit to the water-switch 54 for cutting off the switch 54 and rendering the device inoperative.

In Fig. 9 a further modification of the invention is illustrated wherein time delay relays are used for timing the operation of the several closing mechanisms.

Referring to Fig. 9, 15 indicates the mechanism for closing the top of the car, and 24, 25, 26 and 27 the mechanisms for closing the several windows individually. The manually operable switch 19 for closing the circuit to the mechanism 15, and similar switches 33, 34, 35 and 36 in the circuits to the respective window closing mechanisms are provided for selectively closing the top and windows. Also means are provided for automatically closing the several closures in the event of rain, and said means are preferably so arranged as to close the same in group sequence, all as fully explained in the description relating to the form of the invention shown in Fig. 1. Where possible, the elements similar to those hereinbefore described will be given corresponding reference characters.

The switches 33 and 34 for the front window mechanisms are connected in parallel to the positive lead 17 of the battery 16 by a conductor 120; and the switches 35 and 36 are similarly connected with said lead by a conductor 121. Conductors 24', 25', 26', and 27' connect the opposite sides of the respective window mechanisms to a negative lead 122. The top actuating mechanism 15 is connected to the battery 16 by conductors 122 and 123, and the switch 19 is interposed in the latter.

Connected in parallel with the switch 19, the pair of switches 33 and 34, and the pair of switches 35 and 36, are delay relay switch assemblies A, B and C respectively. The assemblies A, B and C are connected in series, and are actuated in timed sequence when current is initially supplied thereto through the water-switch 54, the contact 58 of which is connected to the positive side of the battery by a conductor 64. The contact 59 is connected by conductor 65 to a relay switch 66 having a fixed contact 67 connected to conductor 65, and an armature 68 connected through conductor 69, to the positive side of the battery forming a shunt circuit for holding the contact elements 67—68 closed for the duration of the complete operation of the device, whether or not the water-switch is opened by drainage of the water therefrom. A switch arm 71, mechanically connected to the armature 68 and movable therewith, is also connected to the conductor 69 and is adapted to engage a contact 72 when the relay 66 is energized, as will be more fully described hereinafter.

Each of the relay switch assemblies A, B and C comprises generally a relay coil, an armature electrically connected to the positive side of the battery, a pair of contacts adapted to be simultaneously engaged by the armature when the coil is energized, one of said contacts being in the circuit of the coil and the other contact being electrically connected to the respective closure operating mechanism which it is adapted to control. The assembly A is adapted to control the top operating mechanism, and the assemblies B and C to control the front and the back window mechanisms respectively. Each assembly includes a time switch which may be of any preferred form, but herein illustrated and described as a bi-metallic switch arm and a heating element. A fourth delay relay switch assembly D of similar construction is connected in series with the assemblies A, B and C and is adapted to stop the device after the complete operation thereof is finished, as will be described hereinafter.

The contact 72 of the relay 66 hereinbefore described, is electrically connected by conductor 124 with the coil 125 of relay assembly A. The relay has a fixed contact 126 connected to the circuit thereof, and a contact 127 connected to the conductor 123, between the top operating mechanism 15 and the switch 19, thereby connecting the same in parallel. The armature 128 of the relay 125 is connected to the positive side of the battery, as by a conductor 129 so that upon energization of the relay 125 the circuit will be closed to the top mechanism 15, starting the apparatus into operation.

To complete the circuit of the relay 66, a conductor 130 extends to a contact 131 of a normally closed switch, the arm 132 of which is connected as by conductor 133 to a negative lead 134 of the battery.

Mechanically connected to the armature 128 of the assembly A, but insulated therefrom, is a switch arm 136 connected by conductor 137 with the negative lead 134. When the relay is energized to close the circuit to mechanism 15, the switch arm 136 engages a contact 138 closing a circuit through a heating element 139 of a time switch. This switch may be of any preferred form, but as illustrated it comprises a bi-metallic arm 140, which when heated by the element 139 engages a contact 141. The arm 140 is connected by conductor 142 to the positive lead of the battery and when contact is made, the circuit is closed through the relay coil 145 of assembly B.

It should be noted that the circuit of the relay 125 is completed through a normally closed switch constituting a portion of the assembly B; said switch comprising a switch arm 146 connected to the negative lead 134 as by conductor 146; and a contact 147 connected to the relay coil 125 by the conductor 148.

The armature 150 of the relay 145 is connected to the positive lead of the battery, and when the coil 145 is energized the armature engages a contact 151 connected to the circuit of the coil, and also engages a contact 152 which is connected by conductors 153 with the front window mechanisms 24 and 25, thereby setting the same into operation.

The armature 150 is mechanically connected to the switch arm 146, but is insulated therefrom; and when the armature 150 engages the contacts 151 and 152, said switch arm 146 engages a contact 154 connected to a heating element 155 of a time delay switch which includes a bi-metallic arm 156 and contact 157. As the arm 156 is heated it engages the contact 157 which closes the circuit through a relay coil 160 forming a part of the relay assembly C. The circuit of the coil 145 is completed through a normally closed switch forming a part of assembly C and comprising a switch arm 161 connected by conductor 162 to the negative lead 134, and a contact 162 connected to the coil 145 by conductor 164.

Upon energization of coil 160 the armature 165 engages contact 166 in the coil circuit, and also contact 167 which is connected to the back window closing mechanisms by conductors 168, thereby setting said mechanisms into operation to close the back windows. As the armature is moved into engagement with contacts 166 and 167, the switch arm 161 engages the contact 169, closing the circuit to heating element 170 which actuates the switch arm 172 causing the same to engage contact 173. This closes the circuit to the relay coil 175 of a relay assembly D. Energization of relay coil 175 causes armature 176 to engage contact 177 and electrically lock the armature in place, as will be described hereinafter. A switch arm 178 connected to the negative lead 134, and normally held in engagement with a contact 179 connected by a conductor 180 to coil 160, completes the initial circuit of said coil.

Contact 177 is connected to the heating element 185 of a time delay relay switch arm 186 which is normally in engagement with a contact 187 electrically connected to armature 176 by a conductor 188; and said arm 186 is connected electrically to the positive lead 17 of the battery. When the armature 176 closes against contact 177 the circuit is completed through arm 186, conductor 188 and armature 176 to lock the latter in closed position.

When the armatures of the several relay switch assemblies A, B, C and D engage the contacts 126, 151, 166 and 177 in the circuits to the coils 125, 145, 160 and 175, respectively, the armatures and the switches connected thereto are locked in position until the circuits to the several armatures are broken. This is done successively. When the engagement of arm 146 with contact 147 of assembly B is broken upon energization of the relay 145, the circuit to relay coil 125 is broken thereby releasing the armature 128 and swtich arm 136. This stops the operation of the top closing mechanism 15. When relay 160 is energized the circuit to relay 145 is broken by opening the switch 161—162 thereby stopping the operation of the front window closing mechanisms 24 and 25. Similarly, when energization of relay 175 breaks the engagement between arm 178 and contact 179, the coil 160 is deenergized and the switch 165—167 opens, breaking the circuit to the back window closing mechanisms 26 and 27.

It is obvious that the timing of the successive operations may be regulated by adjusting the distances between the bi-metallic arms when in normal position, and their respective contacts.

As hereinbefore stated, the circuit of the coil 66 is completed through a switch arm 132 and contact 131; the complete circuit being from battery 16, conductor 64 to water-switch 54, then through conductor 65, relay 66, conductor 130, switch 131—132 and conductor 133 to the opposite side of the battery.

The switch arm 132 is mechanically connected to the armature 190 of a relay coil 191 which is connected to the negative lead 134 by a conductor 192, and by a conductor 193 to a contact point 194 adjacent the switch arm 186 of assembly D. A contact 195 is provided in the circuit of the coil 191 to be engaged by the armature 190 when said coil is energized in order to lock said armature in closed position. When the coil 191 is energized, the switch arm 132, which is connected to but insulated from the armature, is moved into engagement with a contact point 197 connected by a conductor 198 to the signal lamp 90 which lamp is also connected to the positive lead 17 by a conductor 199. This movement of the switch arm breaks the engagement thereof with the contact 131, thereby opening the circuit to coil 66, and deenergizing the same.

The rain water switch 54 may be provided with a reciprocatory valve 200 for controlling the drainage of the well 56. Said valve is actuated by a solenoid 201, one end thereof being connected to the conductor 64 from the positive side of the battery, and the other end connected to the contact 197 of switch 132 as by conductor 201'. By this arrangement as soon as the cycle of operations of the device has been completed, and the relay coil energized to close the circuit to the signal lamp 90, as above described, the solenoid 201 will be energized and retract valve 200 to drain the well 56. The valve 200 will remain open as long as coil 191 is energized, thereby maintaining the entire mechanism inoperative.

For resetting the mechanism, a relay coil 205 is provided, said relay having an armature 206, and contacts 207 and 208. The coil 205 is connected in series with the ignition switch 96 by a conductor 209 extending from the negative pole of the switch to said coil, and a conductor 210 from the coil to the negative lead 134 of the battery; and the armature 206 is connected to the positive lead 17 by a conductor 211. Closing the ignition switch energizes relay coil 205 bringing armature 206 into engagement with contact 208 which is connected to conductor 193 leading to relay coil 191. This energizes relay 191, and at the same time breaks the engagement between armature 206 and contact 207, opening the holding circuit of relay 191. By opening the contacts of the ignition switch 96, by turning to the "off" position, the element of time consumed between opening the contact between armature 132 and contact point 195, and the closing of contacts 206—207 of relay 205, automatically resets the relay 191 and closes contacts 131—132 of relay 191 placing the elements in operative position.

When the car is in motion the ignition switch is closed at all times which electrically locks the device from automatic operation. Upon turning the switch to "off" position the entire mechanism will be reset and placed in operative condition.

In some climates or localities, heavy mists and drizzles frequently occur which are sufficient to wet the interior of an open car, but of insufficient magnitude to operate the rain water switch hereinbefore described. To meet such conditions a circuit closer sensitive to all forms of atmospheric moisture may be substituted for the rain water switch; and in Fig. 10 of the drawings I have illustrated diagrammatically a device of this character. As shown therein, two spaced bars 215 and 216 are provided which are connected by a plurality of human hairs 217. The bar 215 is furnished with an adjusting screw 218; and the bar 216 is secured to one end of a lever 219 which is pivotally mounted as at 220. The opposite end of the lever from the bar 216 is connected by a wire or link 221 to one end of a lever 222. The lever 222 is pivotally mounted as at 223 and carries the contact 58 which is electrically connected to the circuit by the conductor 64. The contact 59 is mounted adjacent the contact 58 and is connected to the conductor 65 leading to the relay 66. When the atmosphere is comparatively dry, the hairs 217 contract, and through the levers above described, separate the contacts 58 and 59. When the atmosphere becomes more moist, the hairs lengthen and permit engagement of the contacts; and a light spring 224 may be provided to insure proper contact at such times.

In Fig. 10 the hygroscopically actuated circuit closer above described, is illustrated in conjunction with the circuit shown in Fig. 1; but it is obvious that it may be substituted for the rain water switch in the circuits illustrated in Figs. 8 and 9.

It is believed that the operation of the device will be fully understood from the above description. Although specific embodiments of the invention are illustrated and described, it is to be understood that various changes and alterations may be made without departing from the scope of the invention as set forth in the accompanying claims.

I claim:

1. In an automobile having a convertible top and vertically movable windows, electrically actuated closing means for said top, similarly operated closing means for said windows, and manually operable switches for selectively closing the circuits to said several closing means; in combination with an auxiliary switch in parallel with each of said manually operable switches, means for closing said auxiliary switches comprising a rotary shaft, cams on said shaft adapted to engage and close the last mentioned switches, a motor for driving said shaft, and a rain water actuated switch interposed in the circuit to said motor for automatically closing said circuit.

2. In an automobile having a convertible top and vertically movable windows, electrically actuated closing means for closing said top and said windows, and manually operable switches for selectively closing the circuits to said several closing means; in combination with an auxiliary switch in parallel with each of said manually operable switches, means for closing said switches in the desired sequence, a motor for operating said switch closing means, a rain water actuated switch interposed in the circuit to said motor, a normally closed switch also in said circuit, a relay shunted in said circuit and adapted when energized to open said normally closed switch and maintain the same in open position, a cam operated switch adapted to close the circuit through said second relay after the closing operations have been completed, and a normally closed reset switch in the circuit to said relay, adapted when opened to de-energize said relay and permit closing of said normally closed switch.

3. The combination as set forth in claim 2 further characterized by a pilot light interposed in the circuit to said normally closed switch when the same has been actuated to break the circuit to the first said relay.

4. In an automobile having a plurality of closures, electrically actuated closing means for each of said closures, and manually operable switches for selectively closing the circuits to said several closing means; in combination with auxiliary switches in parallel with said manually operable switches, time delay relays adapted to close said auxiliary switches in timed sequence, and a rain water switch for initially closing the circuit to the first of said relays.

5. The combination as set forth in claim 4 in which the delay relays are connected in sequence with each other and in parallel with the closing means.

6. In an automobile having a plurality of movable closures, electrically controlled means for closing each of said closures, and manually operable switches for selectively closing the circuits to said closing means; in combination with an auxiliary switch in parallel with each of said manually operable switches, means for closing said switches in predetermined order, a signal lamp, a relay for closing the circuit to said lamp, means for closing the circuit to said relay upon completion of the closing cycle, a rain water switch interposed in the circuit to said means for closing said auxiliary switch, said rain water switch including a well, a pair of contacts in said well, a float operable by accumulation of water in the well for closing the circuit through said contacts, a valve in the lower portion of said well, a solenoid in parallel with said lamp for opening said valve simultaneously with the lighting of signal lamp.

7. In an automobile having a convertible top and vertically movable windows, electrically actuated closing means for said top, similarly operated means for each of said windows, and manually operable switches for selectively closing the circuits to said several closing means, in combination with an auxiliary switch in parallel with said manually operable switches, respectively, means for closing said auxiliary switches in sequence, and a rain-water actuated switch for closing the circuit to the first of said auxiliary switches to be operated.

8. The combination as set forth in claim 7, further characterized by a locking switch interposed in the circuit to the first closure actuating switch, a solenoid for actuating said locking switch upon closing of said water actuated switch, and means for automatically breaking the circuit to said solenoid at the completion of the cycle of operation of the device.

9. In an automobile having a convertible top and vertically movable windows, electrically actuated closing means for said top, similarly operated closing means for said windows, and manually operable switches for selectively closing the circuits to said several closing means in combination with an auxiliary switch in parallel with each of said manually operable switches, means for closing said auxiliary switches, a motor for operating said closing means, a switch interposed in the circuit to said motor and actuated by atmospheric precipitation for automatically closing said circuit and means for automatically breaking the circuit to said motor upon completion of the operation of the several closing means.

RICHARD A. DAVIS.

References Cited in the file of this patent

UNITED STATES PATENTS

| Number | Name | Date |
| --- | --- | --- |
| 1,147,559 | Sherman | July 20, 1915 |
| 2,171,329 | Boone | Aug. 29, 1939 |
| 2,173,575 | Binns | Sept. 19, 1939 |
| 2,198,488 | Smith | Apr. 23, 1940 |
| 2,439,121 | Adelson | Apr. 6, 1948 |
| 2,443,687 | Marquard | June 22, 1948 |